Patented Mar. 18, 1952

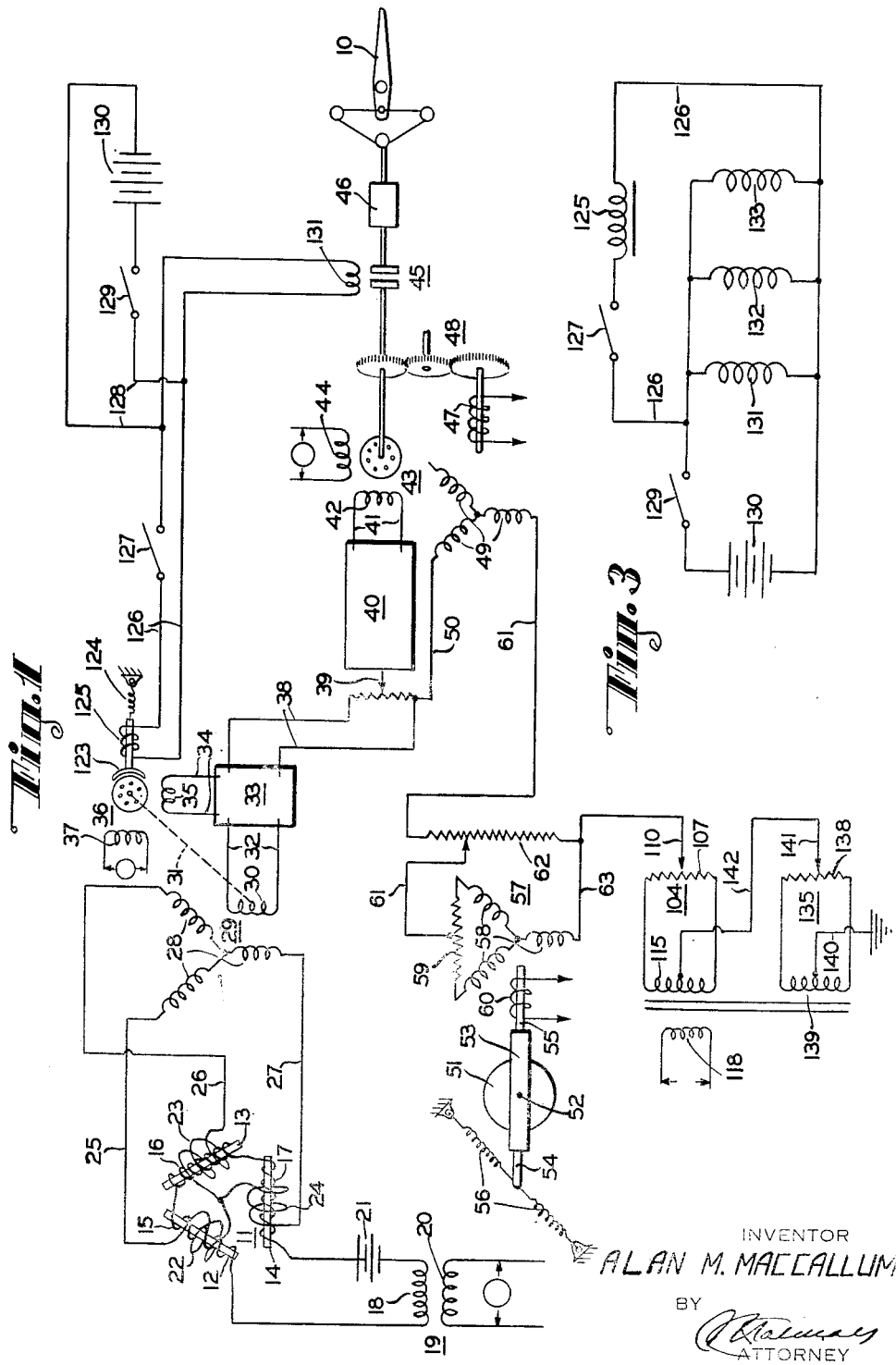

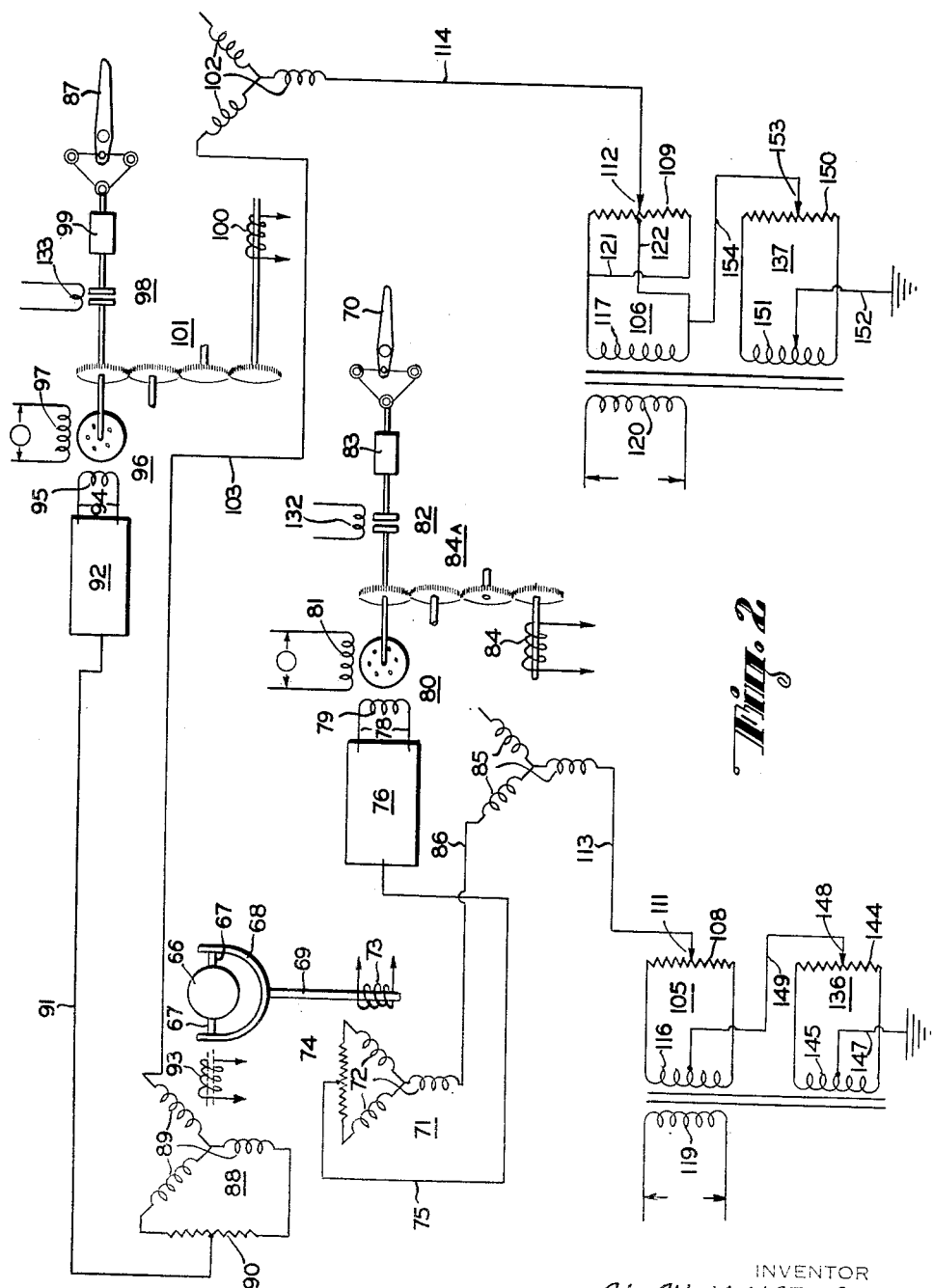

2,589,834

UNITED STATES PATENT OFFICE 2,589,834

AUTOMATIC STEERING SYSTEM

Alan M. MacCallum, Maywood, N. J., assignor to Bendix Aviation Corporation, Teterboro, N. J., a corporation of Delaware Application January 31, 1946, Serial No. 644,642

13 Claims. (Cl. 318—489)

The present invention relates generally to automatic steering systems adapted for use with mobile craft and more particularly to systems which may be applied equally as well to the automatic steering of both air or water craft.

All electric automatic pilot systems heretofore known of the character shown and described in copending application Serial No. 516,488, filed December 31, 1943, are admirably suited for use with large craft such as, for example, passenger or cargo craft, bombers, etc., but are not suitable for use with light, fast aircraft such as, military fighter craft, for example, and the present invention contemplates the provision of a lightweight automatic steering system for use with small and fast aircraft.

In providing automatic steering systems for mobile craft it is desirable that the system be so designed that the directional signal reference means be maintained in synchronism with the control surface during manual flight so that upon the initiation of automatic steering the entire system is in condition to take over control immediately without injecting severe jolts, etc., to the craft. In the aforementioned application one manner of attaining the desired end is illustrated by the provision of an inductive transmitter device within the master direction indicator which, during turn or manual flight, is centralized at its null position by means of centralizing means so that upon the initiation of automatic steering the inductive transmitter device and the rudder will start from a null or neutral position, the inductive transmitter device being displaced during craft deviation from a prescribed course by a motor which also drives an inductive coupling device to its null position.

The novel automatic steering system of the present invention embodies a novel and more simple synchronizing expedient in that the inductive transmitter device is eliminated and, during turn or manual flight, a motor is free to drive an inductive coupling device to null so that the directional reference will always be in synchronism with the rudder control surface. During automatic flight, on the other hand, the motor is locked so that a signal will be developed in the inductive coupling device and retained there for communication to the rudder servomotor for the energization thereof for the return of the craft to its prescribed course.

An object of the present invention, therefore, is to provide a novel, simple and lightweight automatic pilot system adapted for providing one, two or three axes of control for air or water craft.

Another object of the invention is to provide a novel automatic pilot for use with fast and lightweight craft.

A further object is to provide a novel lightweight automatic pilot having simple and novel synchronizing means therein whereby the steering system is always maintained in condition to immediately take over steering control from the human pilot.

Another object is to provide a novel automatic pilot in which rudder control is responsive to the algebraic sum of displacement, rate of displacement, and follow-up signals, the generating means for developing such signals being connected with each other in series.

A still further object of the invention is to provide a novel all electric automatic pilot for aircraft adapted for providing control about three axes of the craft and having automatic turn and trim provisions therefor.

The above and other objects and advantages of the present invention will appear more fully hereinafter from a consideration of the detailed description which follows, taken together with the accompanying drawings wherein one embodiment of the invention is illustrated. It is to be expressly understood, however, that the drawings are for the purpose of illustration and description only, and are not designed as a definition of the limits of the invention.

In the drawings, wherein like reference characters refer to like parts throughout the several views, Figure 1 is a diagrammatic illustration of the rudder control system of the novel lightweight automatic pilot of the present invention;

Figure 2 is a view similar to that of Figure 1 illustrating the aileron and elevator control systems hereof; and, Figure 3 is a detail view showing the motor control and clutch control electrical hook-up of the novel pilot hereof.

Referring now to the drawings and more particularly to Figure 1 thereof for a more detailed description of the present invention, the mechanism for actuating a rudder control surface 10 comprises a magnetic pick-up unit, generally designated with the reference character 11, which is constituted by three laminated legs or cores 12, 13 and 14, each of which is provided with a single primary or energizing winding 15, 16 and 17, the latter being connected in series with each other and with a secondary winding 18 of a transformer 19 whose primary winding 20 is connected with a suitable source of alternating current (not shown). Moreover, interposed between the primary or energizing windings is a battery 21 whereby windings 15, 16 and 17 are fed with undulating or varying unidirectional current. The cores 12, 13 and 14, further are provided with secondary windings 22, 23 and 24 which are Y-connected at the inner ends and at their outer ends connect by way of leads 25, 26 and 27 with a three phase wound stator 28 of an inductive coupling device 29.

Although but one pick-up device 11 has been illustrated, two such devices may be used and interconnected together to thereby provide a greater working signal as shown in copending application Serial No. 624,710 filed October 26, 1945, now abandoned. The pick-up unit 11 is rigidly fastened directly to some part of the craft such as the wing, for example, where a minimum of disturbance due to local magnetic fields exists.

Assuming magnetic pick-up device 11 to be disposed in the earth's magnetic field in a substantially horizontal plane (which is established by the gyro vertical pick-offs to be hereinafter more fully described) and with no energizing current in primary windings 15, 16 and 17, the flux of the earth's magnetic field will thread each of the cores 12, 13 and 14 varying in amount with the angular disposition of each core relative to the field. So long as the earth's flux in each core or leg is in a steady state, no voltages will be induced in secondaries 22, 23 and 24 but as soon as undulating or a varying uni-directional current is supplied to primary windings 15, 16 and 17, the cores are saturated periodically, or once per cycle of the current at the source connected to primary 20 of the transformer, whereby the earth's flux will leave cores 12, 13 and 14 at a rate depending upon the frequency of the current source. Voltages will be induced in secondary windings 22, 23 and 24 setting up therein as well as within wound stator 28 alternating currents having the same frequency as the fundamental frequency of the current source. Pick-up device 11 thus operates as an earth inductor compass in that for every craft deviation from a prescribed course, however small, the induced voltages at secondaries 22, 23 and 24 will vary in accordance with and be proportional to the deviation.

For a condition of equilibrium, with the craft on course and in a substantially horizontal plane, the voltages within the stator windings 28 will correspond to the voltages at the three taps of secondaries 22, 23 and 24 of the pick-up device. At the same time, a rotor winding 30 inductively coupled with stator 28 and carried by a suitable shaft 31 will be in an angular position with its electrical axis normal to the resultant of the magnetic field of the stator windings so that the voltages in the latter have no inductive effect on the rotor winding. As soon as the craft deviates from a prescribed course, the voltages at secondaries 22, 23 and 24 will vary causing a variation in the voltages of each of the stator windings. Such a change at the stator produces an angular change in the resultant of the magnetic field thereat and, since the electrical axis of the rotor winding is no longer normal to the resultant of the field at the stator, a signal is induced within rotor winding 30 which is proportional to the angle of craft deviation from its prescribed course.

The signal induced within rotor winding 30 is fed by way of conductors 32 into a conventional vacuum tube amplifier 33, the output of which is connected by leads 34 to the variable phase winding 35 of a two phase induction motor 36, the second phase winding 37 of which is continuously energized from a source of alternating current such as the source connected to the primary 20 of transformer 19. A conventional phase shifting network (not shown) may be provided in amplifier 32 so that the phases of the current within the two motor windings will be substantially 90° apart.

Upon energization of phase winding 35, the motor 36 drives rotor winding 30 directly through shaft 31 to a null position, i. e., a position wherein the electrical axis of the rotor winding assumes a position normal to the new resultant of the stator field at which point the signal in winding 30 approaches zero and phase winding 35 of the motor is de-energized whereupon the motor comes to a stop.

As will hereinafter more fully appear, motor 36 is locked against rotation during automatic flight, so that a signal developed by pick-up device 11 as a result of a deviation from a prescribed course will be reproduced within rotor winding 30, and since the latter cannot be driven to a null by the motor, the signal thereof is communicated by leads 38 and 39 to the input of a conventional vacuum tube amplifier 40 and out therefrom by way of conductors 41 to the variable phase 42 of a two phase servomotor 43, the second phase 44 of which is constantly energized from a suitable source of alternating current. Amplifier 40 may be of the character illustrated and described in the aforementioned copending application Serial No. 516,488.

Energization of variable phase 42 causes the servomotor to drive rudder control surface 10 through an electromagnetic clutch 45 and a speed reduction gearing 46. Operation of motor 43 causes displacement of a rotor winding 47, which is connected to a suitable source of current, through a speed reduction gear system 48, the winding being displaced relative to its stator winding 49, whereby a signal is induced in the latter and fed by way of a lead 50 to be impressed on the direction signal at the input of amplifier 40. Stator 49 and rotor 47 constitute an inductive follow-up device developing a follow-up signal with each craft deviation.

By impressing upon the direction signal, another signal that is dependent upon the craft's angular velocity or rate of turn, it is possible to control craft oscillation whereby dead beat steering and extreme stability under all weather conditions can be obtained. To this end a rate of turn gyro is provided having a rotor 51 provided with normally horizontal spin axis and supported by way of trunnions 52 within a gimbal frame 53, the frame being supported by outer trunnions 54 and 55 for oscillation about a second horizontal axis perpendicular to the spin axis. Gyro precession is yieldably constrained to a rate of turn function by way of springs 56 connected to trunnion 54.

In order to generate a signal proportional to the rate of craft turn, an inductive transmitter device 57 is provided comprising a three phase wound stator 58, two phases of which are interconnected through a resistor 59, and a wound rotor 60 connected with a suitable source of current and inductively coupled with the stator. Rotor 60, further, is mounted on trunnion 55 for motion therewith. Stator 58 has a voltage generated in each of its windings proportional, respectively, to the angular position of each of the windings relative to rotor 60 and the signal resulting therefrom is communicated by lead 61, which connects stator 58 in series with the stator of the follow-up signal generating device, to be impressed upon the direction and follow-up signals at the amplifier input. A resistor 62 interposed between a lead 63 and lead 61 is provided so that an initial setting of the amount of rate signal to be fed into the rudder channel may be predetermined.

In the foregoing manner, three signals, i. e., direction, rate and follow-back are mixed or added algebraically within amplifier 40 and act to control operation of servomotor 43. During an initial craft displacement from a prescribed course, the rate signal aids the direction signal and opposes the follow-back signal so that rudder is applied more rapidly than it would be by the direction signal alone and during a return to course the rate signal (the craft's angular velocity now being in an opposite direction) opposes the direction signal but adds with the follow-back signal so that the craft is prevented from overswinging from its prescribed course once it returns thereto. This action provides the rudder with a slight deflection in an opposite direction when it approaches "on course" so that it is braked to remain on such course. The static rudder position is therefore made to be algebraically proportional to the sum of the rate and direction signals.

Signals for the control of the craft about the bank and pitch axes are derived from take-offs associated with an artificial horizon gyro, generally designated in Figure 2 with the reference character 64, whereby magnetic pick-up device 11 is stabilized in attitude, i. e., maintained in a substantially horizontal plane. To this end, gyro 64 comprises a driven rotor having normally vertical spin axis and mounted within a rotor frame 66 which is supported by trunnions 67 for oscillation about a horizontal axis within a gimbal ring 68, the latter being mounted by way of an outer trunnion 69 for oscillation about a second horizontal axis perpendicular to the first axis. The gyro is so arranged that its outer trunnion 69 is parallel with the fore and aft axis of the craft to thereby define the bank axis while trunnions 67 are parallel with the craft's transverse axis to thereby define the pitch axis.

For actuating aileron surfaces 70 to thereby control the craft about its longitudinal axis and thus also stabilize the magnetic pick-up device 11 in bank, an inductive transmitter device 71 is provided having a wound stator 72 and an inductively coupled rotor winding 73 carried by trunnion 69 for angular motion therewith. The rotor winding is connected to a suitable source of current while two of the stator windings are interconnected by a resistor 74 which is center tapped by a lead 75 connecting the stator with the input of the aileron channel of an amplifier 76. For a no bank condition, the normal position of rotor winding 73 relative to its stator is such that its electrical axis is perpendicular to the stator windings and no signal is induced in the latter. Upon a craft bank, rotor winding 73 moves angularly with trunnion 69 relative to the stator windings to thereby induce a signal in the latter proportional to the amount of craft bank which is amplified within amplifier 76 and supplied at the output thereof by leads 78 to energize the variable phase 79 of a two phase servomotor 80, the second phase 81 of which is continuously energized from a suitable source of current.

Energization of the variable phase 79 causes servomotor 80 to drive aileron control surfaces 70 through an electromagnetic clutch 82 and a speed reduction gearing 83. Operation of motor 80 causes displacement of a rotor winding 84, which is connected with a suitable source of current, through a speed reduction gear system 84a, the winding being displaced relative to its wound stator 85 whereby a signal is induced in the latter and fed by way of a lead 86 to the input of amplifier 76, the wound stators 85 and 72 being connected in series with each other and the amplifier input. Wound stator 85 and rotor winding 84 constitute an inductive follow-up device which develops a follow-up signal with each craft deviation about its longitudinal axis, this signal being added algebraically to the bank signal for aileron control.

For the purpose of actuating elevator surfaces 87 to thereby control the craft about its transverse axis and thus also stabilize magnetic pick-up device 11 in pitch, an inductive transmitter device 88 is provided comprising a fixed wound stator 89, two windings of which are interconnected by a resistor 90, the latter being center tapped by a lead 91 which connects the stator with the input of a vacuum tube amplifier 92, and a rotor winding 93 inductively coupled with the stator and connected with a suitable source of current, the rotor winding being carried by trunnion 67 of vertical gyro 64. Normally the rotor winding assumes a position relative to its stator in which its electrical axis is normal to the stator and no signal is induced in the latter. With craft pitch, however, relative motion is developed between stator 89 and rotor 93 and a signal is induced in the stator proportional to craft climb or descent.

The signal so developed within stator 89 is amplified within amplifier 92 and supplied at the output thereof by leads 94 to the variable phase 95 of a two phase servomotor 96, the second phase 97 of which is continuously energized from a suitable source of current.

Upon the energization of variable phase 95, motor 96 drives elevator control surfaces 87 through an electromagnetic clutch 98 and a speed reduction gearing 99. Operation of motor 96 causes displacement of a rotor winding 100, which is connected with a suitable source of current, through a speed reduction gear system 101, the winding being displaced relative to its wound stator 102 whereby a signal is induced in the latter and fed by way of a conductor 103 to the input of amplifier 92, the wound stators 89 and 102 being connected in series with each other and the amplifier input. Wound stator 102 and rotor winding 100 constitute an inductive follow-up device which develops a follow-up signal with each craft deviation about its transverse axis, the signal being added algebraically to the bank signal for elevator control.

The system thus far described constitutes an all electric automatic steering system providing three axes of control, i. e., with a given course and attitude established manually a subsequent engagement of the system will automatically maintain the craft on that course and in that attitude. In order to provide the human pilot with a readily accessible control for throwing the craft into an automatic turn, rudder turn, aileron turn and elevator turn devices 104, 105 and 106 are provided, each constituting a potentiometer having a resistor 107, 108 and 109 and a wiper or contact arm 110, 111 and 112, wiper arm 110 being connected in series by way of lead 63 with wound stator 58 of the rate inductive device, wound stator 49 of the inductive follow-back device and the input of amplifier 40; wiper arm 111 being connected in series by way of a lead 113 with the wound stator 85 of the inductive bank follow-up device, wound stator 72 of the bank inductive transmitter device and the input of amplifier 76, while wiper arm 112 is connected in series by way of lead 114 with the wound stator 102 of the inductive pitch follow-back device, wound stator 89 of the pitch inductive transmitter device and the input of amplifier 92.

Each potentiometer resistor 107, 108 and 109 is connected across a related secondary winding 115, 116 and 117 of transformers having primary windings 118, 119 and 120 energized from a suitable alternating current source. Normally, wiper contacts 110, 111 and 112 are located at a central point on resistors 107, 108 and 109 so that no signals are transmitted by turn devices 104, 105 and 106 to their respective control channels.

As shown and described more fully in copending application Serial No. 644,799, filed February 1, 1946, all three wiper contacts 110, 111 and 112 may be mounted on a common shaft and operated by a single turn knob so that manipulation of the latter will throw the craft into any degree of turn desired. By displacing wiper contacts 110, 111 and 112 relative to their resistors 107, 108 and 109, rudder, aileron and elevator signals are developed independently of the magnetic pick-up device 11, the rate of turn gyro and the pitch and bank take-offs of the gyro vertical to deflect rudder, aileron and elevator surfaces to direct the craft into the degree of turn called for by the setting of the turn knob. In the aileron and elevator channels, the signals introduced by the displacement of wiper contacts 111 and 112 relative to their resistors deflect the aileron and elevator surfaces until the desired craft pitch and bank are attained whereupon, resulting from the craft attitude change, signals are developed by the bank and pitch take-offs 71 and 88 which will wash out the signals set in by movement of wiper contacts 111 and 112 when the craft attitude set in by the turn knob has been attained. Subsequent deviation from the required craft attitude is under the control of the gyro bank and pitch take-offs.

Inasmuch as up-elevator is required in the event of either a left or right turn, the pitch turn device 106 differs from the rudder and aileron turn devices 104 and 105 in that secondary winding 117 of the former is connected at one end by way of a lead 121 with the opposite end of resistor 109 while the opposite end of secondary winding 117 is connected with the center of resistor 109 by way of a lead 122. By reason of such an arrangement, motion of wiper contact 112 in either direction from its central point on resistor 109 will provide a signal in one direction only, i. e., an up-elevator signal, as distinguished from the reversing signal introduced by wiper contact 111 by its movement from one side of its central position to the other side on resistor 108, for example.

During an automatic turn it is necessary to effectively disconnect the magnetic pick-up device 11 from the rudder channel or otherwise any attempted craft turn would be nullified by device 11, the latter acting to maintain the craft on its previously prescribed course. To this end, motor 36 which normally drives the rotor 30 of the inductive coupling device 29 to its null position is provided with an electromagnetic brake in the form of a plunger 123 which is maintained by a spring 124 out of engagement with the rotor of the motor. The plunger is inductively associated with a coil 125 which connects through leads 126, a turn switch 127, leads 128 and a clutch switch 129 with a battery 130. Also connected, as better shown in Figure 3, for energization by the closure of clutch switch 129 are coils 131, 132 and 133 for engaging clutches 45, 82 and 98 whereby rudder servomotor 43 is drivably engaged with rudder surface 10, aileron servomotor 80 is drivably engaged with aileron surfaces 70 and elevator servomotor 96 is drivably engaged with elevator surfaces 87.

During straight automatic flight, clutch switch 129 is closed to thereby establish a drivable connection between the servomotors and their related control surfaces and turn switch 127 is likewise closed thereby energizing coil 125 so that plunger 123 brakes the rotor of motor 36 against rotation so that any craft deviation in azimuth develops a signal in rotor winding 30 by the operation of the magnetic pick-up device 11 which acts to operate servomotor 43 and thereby actuate rudder surface 10.

With the initiation of an automatic craft turn, i. e., when wiper contacts 110, 111 and 112 are displaced relative to their resistors 107, 108 and 109, turn switch 127 is opened to de-energize coil 125 whereupon spring 124 retracts plunger 123 from engagement with motor 36 so that the latter is free to rotate in response to signals developed within rotor winding 30. Thus, during an automatic turn, even though magnetic pick-up device 11 is constantly developing a signal proportional to the amount of craft displacement in azimuth which signal is reproduced within rotor winding 30, the motor 36 being free to turn drives rotor 30 to its null so that no displacement signal is available from pick-up device 11 for the rudder channel during such a turn.

By providing an arrangement whereby motor 36 is locked against rotation during straight automatic flight and is unlocked for rotation and operation during manual flight or during an automatic craft turn, a novel synchronization feature is presented whereby the system is always in synchronism, i. e., prior to the initiation of straight automatic flight the rotor winding 30 of the coupling inductive device is at its null position to immediately take over control of the rudder surface. In response to any deviation from a prescribed course a signal is developed within winding 30 proportional to the deviation and since motor 36 is braked or locked and cannot drive winding 30 to its null, the signal is communicated from winding 30 to operate servomotor 43.

During straight automatic flight, switches 127 and 129 are closed but during an automatic turn switch 127 is opened to free motor 36 for operation. During manual flight, on the other hand, clutch switch 129 is opened to disconnect the servos and permit manual control of the surfaces. At such time, even though turn switch 127 is closed, coil 125 is de-energized, since it connects with battery 30 through the clutch switch, to thereby release motor 36 for operation.

Even though the rudder channel has been shown as provided with an amplifier 40 and aileron and elevator channels with separate amplifiers 76 and 92, it is to be understood that but one amplifier is needed containing all three channels as shown in the aforementioned copending application Serial No. 516,488.

Under certain conditions it is desired to trim rudder and/or aileron and elevator and to this end novel rudder trim, aileron trim and elevator trim devices 135, 136 and 137 are provided. Rudder trim device 135 comprises a potentiometer having a resistor 138 connected across a secondary winding 139 of the transformer having winding 118 for its primary. A central tap of the secondary winding is grounded by way of a conductor 140 while resistor 138 is provided with a wiper contact 141 which is arranged at a normally central point on resistor 138, wiper 141 being connected by way of a lead 142 with a central portion of secondary winding 115. Thus arranged, rudder trim device 135 is in series with rudder turn device 104, the rate inductive device, rudder inductive follow-back device and the input of the rudder channel of the amplifier.

Aileron trim device 136 comprises a potentiometer having a resistor 144 connected across a secondary winding 145 of the transformer having winding 119 for its primary. A central tap of the secondary winding is grounded by way of a conductor 147 while resistor 144 is provided with a wiper contact 148 which is arranged at a normally central point on resistor 144, wiper 148 being connected by way of a lead 149 with a central portion of secondary winding 116. As will be apparent, aileron trim device 133 is in series with aileron turn device 105, stator 85 of the bank follow-back device, stator 72 of the bank take-off device and the input of the aileron channel of the amplifier.

Elevator trim device 137, on the other hand, comprises a potentiometer having a resistor 150 connected across a secondary winding 151 of the transformer having winding 120 for its primary. A center tap of the secondary winding is grounded by way of a conductor 152 while resistor 150 is provided with a wiper contact 153 which is arranged at a normally central point on resistor 150, wiper 153 being connected by way of a lead 154 with secondary winding 117 at that end which connects by way of lead 122 with the center tap of resistor 109 of the pitch turn device 106. Thus arranged, elevator trim device 137 is in series with elevator turn device 106, stator 104 of the pitch follow-back device, stator 89 of the gyro pitch take-off device and the input of the elevator channel of the amplifier.

If left or right rudder trim is required, wiper arm 141 is displaced relative to resistor 138, above or below the center point thereof, and the required signal is fed by lead 142 into the rudder channel of the amplifier. Similarly for bank or pitch trim, wiper contacts 148 and 153 are displaced relative to their resistors 144 and 150, above or below their normally central position, to feed required bank or pitch trim signals in the aileron and/or pitch channel of the amplifier.

There has thus been provided a novel and simple as well as lightweight pilot for small and fast craft having novel means therein whereby the system is always synchronized for taking immediate and smooth control of the craft in azimuth whether subsequent to manual flight or to an automatic turn. In all other respects the general operation of the system is similar to that described in copending application Serial No. 516,489, filed December 31, 1943.

Although but a single embodiment of the invention has been illustrated and described in detail for controlling a craft about one or more axes thereof, it is to be expressly understood that the invention is not limited thereto. Various changes may also be made in the design and arrangement of the parts without departing from the spirit and scope of the invention as the same will now be understood by those skilled in the art. For a definition of the limits of the present invention reference will be had primarily to the appended claims.

What is claimed is:

1. In an automatic steering system for an aircraft having a rudder surface and driving means for operating the rudder surface, the combination of an inductive device having a multi-polar stator winding and a rotor winding, an actuating device connected to said rotor winding for driving the latter relative to said stator winding, a source of current, direction responsive means including an induction device comprising a core of permeable magnetic material adapted to receive a magnetic flux from a unidirectional magnetic field, a multi-polar stator winding on said core, a single phase winding on said core connected for energization by said source of current, means for interconnecting the multi-polar winding of said core to the multi-polar winding of said inductive device whereby a signal proportional to a relative angular displacement of said direction responsive means in azimuth is developed within said rotor winding, means connecting the rudder driving means with said rotor winding, means electrically connecting said rotor winding to said actuating device for energizing the latter to drive said rotor winding to a null position at which time no signal is available for the rudder driving means, and means for braking said actuating device against operation whereby the signal developed within said rotor winding is communicated to the rudder driving means.

2. In an automatic steering system for an aircraft having a rudder surface and driving means for operating the rudder surface, the combination of an inductive device having a multi-polar stator winding and a rotor winding, a servomotor connected to said rotor winding for driving the latter relative to said stator winding, a source of current, direction responsive means including an induction device comprising a core of permeable magnetic material adapted to receive a magnetic flux from a unidirectional magnetic field, a multi-polar stator winding on said core, a single phase winding on said core connected for energization by said source of current, means for interconnecting the multi-polar winding of said core to the multi-polar winding of said inductive device whereby a signal proportional to a relative angular displacement of said direction responsive means in azimuth is developed within said rotor winding, means connecting the rudder driving means with said rotor winding, means electrically connecting said rotor winding to said servomotor for energizing the latter to drive said rotor winding to a null position at which time no signal is available for the rudder driving means and the rudder surface and the direction responsive means are thus maintained in synchronism, and means for braking said servomotor against operation whereby the signal developed within said rotor winding is communicated to the rudder driving means.

3. In an automatic pilot for aircraft provided with a rudder surface, the combination of course change responsive means for normally controlling the rudder surface to maintain the craft against deviation from a prescribed course during linear flight, rudder turn means for developing a signal to actuate the rudder surface and thereby change the craft course independently of said course change responsive means, means for operating said rudder turn means, means for making the course change responsive means ineffective on said rudder, and rudder trim means connected in series with said rudder turn means for trimming the rudder surface.

4. In an automatic pilot for aircraft provided with a rudder surface, the combination of course change responsive means for normally controlling the rudder surface to maintain the craft against deviation from a prescribed course during linear flight, rudder turn means comprising a normally balanced potentiometer device for developing, when unbalanced, a signal to actuate the rudder surface and thereby change the craft course independently of said change responsive means, means for unbalancing said potentiometer device, and means for making the course change responsive means inffective on said rudder.

5. In an automatic pilot for aircraft provided with a rudder surface, the combination of course change responsive means for normally controlling the rudder surface to maintain the craft against deviation from a prescribed course during linear flight, rudder trim means comprising a normally balanced potentiometer device for developing, when unbalanced, a rudder trim signal, means for unbalancing said potentiometer device, rudder turn means comprising a normally balanced potentiometer device connected in series with said rudder trim means for developing, when unbalanced, a signal to actuate the rudder surface and thereby change the craft course independently of said change responsive means, means for unbalancing said rudder turn potentiometer device, and means for making the course change responsive means ineffective on said rudder.

6. In an automatic pilot for aircraft provided with a rudder surface, the combination of course change responsive means for normally controlling the rudder surface to maintain the craft against deviation from a prescribed course during linear flight, rate of course change responsive means for modifying operation of the rudder surface, rudder turn means connected in series with said rate of course change responsive means for developing a signal to actuate the rudder surface and thereby change the craft course, means for actuating said rudder turn means, and means for making the course change responsive means ineffective on said rudder.

7. In an automatic pilot for aircraft provided with a rudder surface, the combination of course change responsive means for normally controlling the rudder surface to maintain the craft against deviation from a prescribed course during linear flight, rudder trim means for developing a signal in addition to the control of said course change responsive means to trim the rudder surface, means for actuating said rudder trim means, rudder turn means connected in series with said rudder trim means for developing a signal to actuate the rudder surface and thereby change the craft course independently of said course change responsive means, means for actuating said rudder turn means, and means for making the course change responsive means ineffective on said rudder.

8. In an automatic steering system for mobile craft having a control surface and driving means for operating the surface, the combination of reference means for producing a signal in response to a departure of said craft from a predetermined position to energize the driving means, means connected for operation by the driving means for producing a second signal for modifying the energization of the driving means, turn means connected in series with said second signal producing means for altering craft position comprising a normally balanced potentiometer device having a wiper arm at a central point thereof for developing a third signal to energize the driving means and thereby turn the craft in a preselected manner, and means operable during operation of said turn means for making said reference means ineffective on said driving means.

9. An automatic pilot for positioning a control surface of a craft comprising an earth inductor device adapted to provide a signal voltage output varying with changes in relative position of the inductor device and the earth's magnetic field, a signal transformer having a stator winding connected to receive the output of the inductor device and a rotor including a winding associated therewith, means connected to receive the signal voltage induced in said rotor winding and controlled thereby for controlling the position of said rotor relative to said stator whereby to zero the signal voltage induced in said rotor winding, a servomotor for actuating said control surface, means responsive to the signal of said rotor winding for actuating said servomotor, and means operable during straight craft flight for making said positioning means ineffective on said rotor winding.

10. An automatic pilot for positioning a control surface of a craft comprising an earth inductor device adapted to provide a signal voltage output varying with changes in relative position of the inductor device and the earth's magnetic field, a signal transformer having a stator winding connected to receive the output of the inductor device and a rotor including a winding associated therewith, means connected to receive the signal voltage induced in said rotor winding and controlled thereby for controlling the position of said rotor relative to said stator whereby to zero the signal voltage induced in said rotor winding, a servomotor for actuating said control surface, means responsive to the signal of said rotor winding for actuating said servomotor, means operable during straight craft flight for making said positioning means ineffective on said rotor winding, turn means for actuating said servomotor to alter craft course, and means for making said rotor positioning means effective on said rotor winding.

11. An automatic pilot for positioning a control surface of a craft comprising an earth inductor device adapted to provide a signal voltage output varying with changes in relative position of the inductor device and the earth's magnetic field, a signal transformer having a stator winding connected to receive the output of the inductor device and a rotor including a winding associated therewith, means connected to receive the signal voltage induced in said rotor winding and controlled thereby for controlling the position of said rotor relative to said stator whereby to zero the signal voltage induced in said rotor winding, a servomotor for actuating said control surface, means responsive to the signal of said rotor winding for actuating said servomotor, and means for making said rotor positioning means effective and ineffective on said rotor winding.

12. In an automatic steering system for an aircraft having a positioning surface and driving means for operating the surface, the combination of an inductive device having a multipolar stator winding and a rotor winding, an actuating device connected to said rotor winding for driving the latter relative to said stator winding, a source of current, direction responsive means including an induction device comprising a core of permeable magnetic material adapted to receive a magnetic flux from a unidirectional magnetic field, a multi-polar stator winding on said core, a single phase winding on said core connected for energization by said source of current, means for interconnecting the multi-polar winding of said core to the multi-polar winding of said inductive device whereby a signal proportional to a relative angular displacement of said direction responsive means in azimuth is developed within said rotor winding, means connecting the surface driving means with said rotor winding, means electrically connecting said rotor winding to said actuating device for energizing the latter to drive said rotor winding to a null position at which time no signal is available for the surface driving means, and means for making the actuating device ineffective on said rotor winding whereby the signal of the latter is communicated to said surface driving means.

13. In an automatic pilot for positioning a control surface of a craft, reference means for positioning said surface comprising a two-part signal generator for providing a signal voltage output varying with changes in craft position relative to a pre-selected position, one part of said signal generator being fixed to said craft and the other part thereof being movable relative to said fixed part, turn means for producing a signal to assume primary control of said surface, and means adapted for operation when said surface is under the control of said turn means for driving the movable part of said signal generator to a non-signal generating position relative to said fixed part.

ALAN M. MacCALLUM.

REFERENCES CITED

The following references are of record in the file of this patent:

UNITED STATES PATENTS

| Number | Name | Date |
| --- | --- | --- |
| 1,958,258 | Alexanderson | May 8, 1934 |
| 2,005,530 | Boykow | June 18, 1935 |
| 2,126,855 | Wunsch et al. | Aug. 16, 1938 |
| 2,159,142 | Fischer | May 23, 1939 |
| 2,183,932 | Carlson | Dec. 19, 1939 |
| 2,190,390 | Thiry | Feb. 13, 1940 |
| 2,196,385 | De Florez et al. | Apr. 9, 1940 |
| 2,256,875 | Wade | Sept. 23, 1941 |
| 2,270,875 | Hanson et al. | Jan. 27, 1942 |
| 2,361,790 | Noxon | Oct. 31, 1944 |
| 2,398,421 | Frische et al. | Apr. 16, 1946 |
| 2,416,097 | Hansen et al. | Feb. 18, 1947 |
| 2,429,642 | Newton | Oct. 28, 1947 |
| 2,450,084 | Emerson | Sept. 28, 1948 |
| 2,452,311 | Markusen | Oct. 26, 1948 |
| 2,464,629 | Young | Mar. 15, 1949 |

OTHER REFERENCES

"Electronics," of October, 1944, pages 110–117, inclusive.